Figure 1:
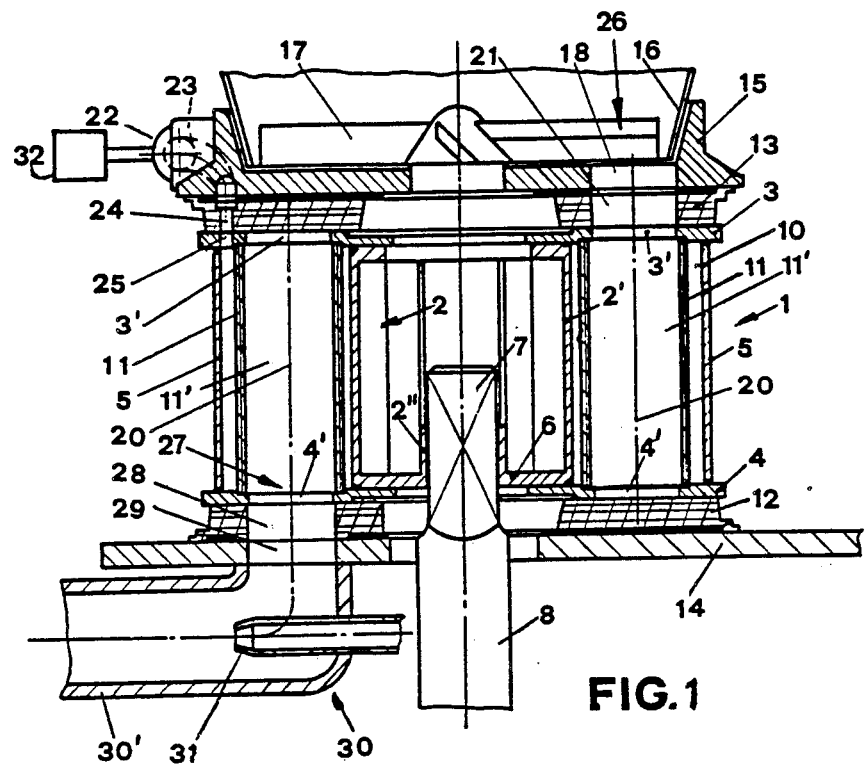

United States Patent [19]

Egger

[11] Patent Number: 4,681,484
[45] Date of Patent: Jul. 21, 1987

[54] METHOD OF AND APPARATUS FOR CONVEYING POWDERED OR GRANULAR MATERIAL

[75] Inventor: Hans R. Egger, Küsnacht, Switzerland

[73] Assignee: Intradym Maschinen AG, Winterthur, Switzerland

[21] Appl. No.: 692,102

[22] Filed: Jan. 16, 1985

[30] Foreign Application Priority Data

Jan. 17, 1984 [CH] Switzerland .................. 194/84

[51] Int. Cl.[4] .......................................... B65G 53/46
[52] U.S. Cl. ..................... 406/63; 222/217; 222/370
[58] Field of Search .................. 406/63–68; 414/219, 220; 222/217, 370, 636

[56] References Cited

U.S. PATENT DOCUMENTS

| 3,399,931 | 9/1968 | Vogt | 406/64 |
| 4,092,046 | 5/1978 | Bombelli et al. | 406/64 |
| 4,376,600 | 3/1983 | Egli | 406/64 X |
| 4,462,719 | 7/1984 | Egger et al. | 406/64 |

FOREIGN PATENT DOCUMENTS

| 2734311 | 2/1978 | Fed. Rep. of Germany | 406/66 |
| 434408 | 8/1935 | United Kingdom | 406/63 |

Primary Examiner—Jeffrey V. Nase
Attorney, Agent, or Firm—Cushman, Darby & Cushman

[57] ABSTRACT

A rotor (1) of a machine for spraying concrete, mortar or a refractory lining material comprises conveying chambers (11') arranged concentrically around its axis, and delimited by cylindrical walls (11) of a porous, air-permeable material, the inside of the walls (11) being machined smooth. Each cylindrical wall (11) is surrounded by an air chamber (10), each of which is acted upon, between a charging point (26) and a discharge point (27), by the pressure of a compressed air source (32) so as to produce air flows which pass through the porous walls (11) into the conveying chambers (11'). The material to be conveyed by the conveying chambers (11') between the charging point (26) and the discharge point (27) is at least in the regions close to the wall acted upon by these air flows so as to prevent the material from adhering to the chamber walls (11'). The discharge through the discharge opening (27) into a conveying line (30) takes place essentially by gravity and by the action of an injector nozzle (31). Since the air flows supplied through the chamber walls (11) are only small, the action of the injector nozzle (21) is not disturbed by compressed air surges, so that a uniform conveying of the material through the conveying line (30) is possible.

10 Claims, 2 Drawing Figures

METHOD OF AND APPARATUS FOR CONVEYING POWDERED OR GRANULAR MATERIAL

The invention relates to a method of conveying powdered or granular material, in particular for spraying concrete, mortar or a refractory lining material.

Such an apparatus serves to meter and feed the material from a tank which is under atmospheric pressure into a conveying line which is under over-pressure. The rotor may, for example, be part of a concrete gun, whereas the conveying line ends in a hose with a spraying nozzle through which concrete is sprayed onto a base, eg. a tunnel wall.

In the German Utility-Model Patent DE-H No. 83 24 601 (Meynadier und Cie. AG) an apparatus is described for spraying concrete, mortar or refractory lining materials. With this apparatus the content of the chambers is discharged, the one after the other, into the conveying line at the discharge point by means of compressed air. The compressed air is also used here for scavenging the conveying chambers so as to empty these inasfar as possible. Since the discharge of the material from the conveying chambers takes place in the rhythm at which the conveying chambers pass the discharge point, a pulsating takes place in the conveying line which is superimposed on the uniform jet of compressed air coming out of the injector nozzle. It has been found that the discharge momentum adversely affects the injector action and accordingly also the conveying action thereof and its effectiveness. On the other hand, however, it is desirable to empty the conveying chambers as completely as possible, and in doing so to loosen the material from the chamber walls. Otherwise there exists the risk that the material will solidify on the chamber walls when it is not moved out. The aforementioned pulsation furthermore impedes a uniform guiding of the spraying nozzle and a uniform material application by means of the spraying nozzle.

It is, therefore, the object of the invention to propose a method of the aforementioned type, with which the conveying of the material through the injector is improved, avoiding disturbances of the flow during the emptying of the conveying chambers into the conveying line. Furthermore, an apparatus is to be created for performing the method.

With the solution according to the invention, during the emptying of the conveying chambers no pressure surges occur which would disturb the injector action, since the emptying takes place essentially under the effect of gravity. However, this is only possible in that by the solution according to the invention the material is prevented from adhering to the walls of the conveying chambers. The flow of air passing into the conveying chambers through the walls does, it is true, assist the emptying of the conveying chambers, but is small compared to a surge of compressed air which scavenges the conveying chambers in the longitudinal direction. For this reason no increase in pressure takes place in the conveying line during the emptying of the conveying chambers, so that a uniform conveying capacity is ensured.

Figure 2:
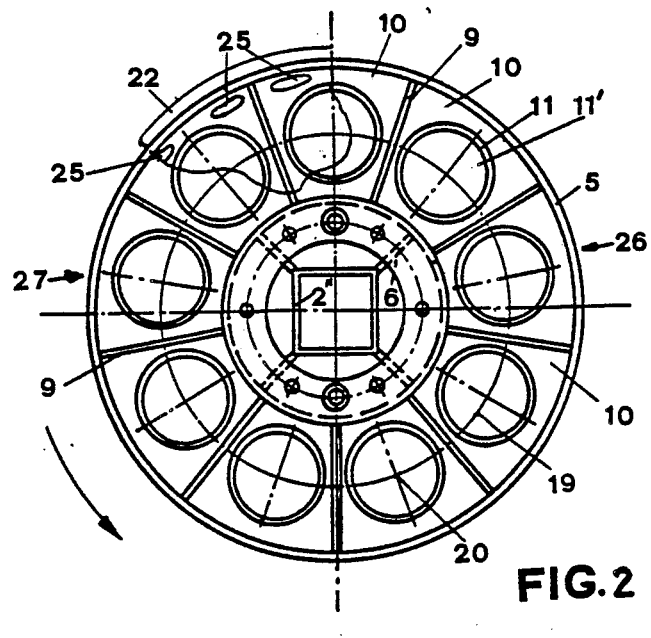

An exemplified embodiment according to the invention will be explained in greater detail with reference to the drawing, wherein:

FIG. 1 shows a vertical section through an apparatus for conveying powdered or granular material, and FIG. 2 shows a top view onto the rotor of the apparatus with details of the air supply.

The apparatus provided for performing the method according to the invention and illustrated as an exemplified embodiment in the drawing, serves to convey powdered or granular material and, in particular, for the spraying of concrete, mortar, or a refractory lining material.

The apparatus according to FIG. 1 comprises a rotor 1, which consists of a hub-like central carrier 2 and top and bottom cover plates 3 and 4, a cylindrical vertical outside wall 5 extending on the circumference between the top and the bottom cover plates 3 and 4. The rotor 1 is arranged on a driver 7 of a vertical shaft 8, and rotates together therewith, this shaft 8 being driven by a non-illustrated motor.

The hub-like central carrier 2 consists of a cylindrical inside wall 2' as well as an inside sleeve 2", which preferably has a rectangular cross-section and forms the bearing of the rotor 1 on the driver 7. The inside sleeve 2" is connected to the cylindrical inside wall 2' by four radial struts 6, which together with the outside wall 5 delimit an annular space.

According to FIG. 2 the annular space is subdivided by radial partition walls 9 into sector-shaped air chambers 10 of the same size. In every air chamber 10 a cylindrical insert 11 is provided. The inserts 11 have air-permeable walls and may, for example, be made as liners of a porous material. The inside wall of these liners is machined in such a way that it has a smooth surface. The top cover plate 3 as well as the bottom cover plate 4 are provided with the same size openings 3' and 4' arranged distributed over the circumference and corresponding with the cylindrical inserts 11.

The rotor 1 is arranged between a top gasket 13 and an identical bottom gasket 12, the latter resting on a base plate 14. Above the gasket 13 a round cap 15 is provided, which is arranged co-axially with the shaft 8 and carries a charging hopper 16. In the hopper 16 a vane wheel 17 is provided, which is directly drive-connected to the shaft 8 or to the rotor 1 in a non-illustrated manner.

The bottom of the cap 15 is furthermore provided with a circular opening 18, the diameter whereof corresponds approximately to the inside diameter of a cylindrical insert 11, and the centre point whereof lies on a circular line 19, along which the vertical centre axes 20 of the inserts 11 are positioned. The top gasket 13 has an opening 21 corresponding to the opening 3', and together with this forms a vertical channel which during the turning of the rotor 1, communicating successively with the openings 3', connects the cylindrical inserts 11 consecutively to the inside of the hopper 16. This points is the charging point 26 illustrated in FIG. 2, where the inserts 11 are charged with a powdered or granular material, which is conveyed by the inserts 11 to a discharge point 27. The inserts 11 form the walls of the conveying chambers 11'.

The cap 15 is provided with a compressed air connection 22 arranged on the circumference thereof and connected to a compressed air source 32, which compressed air connection 22 communicates with an air duct 24 by way of a line 23. The air duct 24 is provided in the top gasket 13 and extends in the shape of an arc between the charging point 26 and the discharge point 27 in the region of the outer edge of the gasket 13. The top cover plate 3 is provided with further openings 25, which form a continuation of the duct 24 and open out into the air chambers 10 outside the inserts 11. It is also possible to provide several ducts 24 which are connected to the same compressed air connection 22, preferably by way of several lines 23. In this manner it is achieved that every sector-shaped air chamber 10 of the rotor 1, during the turning thereof between the charging point 26 and the discharge point 27, is supplied with compressed air.

According to FIG. 1 the insert 11 shown on the right side of this Fig. is positioned with the opening 3′ directly underneath the openings 18 and 21 at the charging point 26, where this insert 11 is charged with material from the hopper 16. At this same time the insert 11 shown on the left side of FIG. 1 is positioned at the discharge point 27, where the bottom gasket 12 has an opening 28, the diameter whereof corresponds approximately to that of the insert 11. The opening 28 opens out, by way of a corresponding opening 29 in the base plate 14, into an outlet elbow which forms the start of a conveying line 30 and is connected to the opening 29. The outlet elbow, which at first extends coaxially and then curves by 90° in relation to the axis of the insert 11, is furthermore provided with an injector nozzle 31, which must be connected to the compressed air source 32. The injector nozzle 31 is arranged coaxially in the bent part 30′.

The direction of rotation of the rotor 1 is indicated in FIG. 2 by an arrow. From the charging point 26 the air chambers 10 with the inserts 11 turn, therefore, in an anti-clockwise direction to the discharge point 27. The stationary air duct 24 in the top gasket 13 extends between the discharge point 27 and the charging point 26. Thus, after the charging point 26, every air chamber 10 comes in communication with the air duct 24, seeing that the openings 25 in the common cover plate 3 pass over the underside of the top gasket 13 in which the air ducts 24 are provided. The other air chambers then follow in each instance after a 40° turn, and after passing the discharge point 27 the compressed air supply stops since the air ducts 24 do not extend beyond the discharge point 27, ie. no compressed air ducts 24 are provided between the discharge point 27 and the charging point 26 (seen in the direction of rotation of the rotor 1).

When the described apparatus is in operation, at the charging point 26 the conveying chamber 11′ which at this moment is situated under this point, is filled with a powdered or granular material, assisted by the rotating vane wheel 17. When the rotor 1 turns in the direction of the arrow, the filled conveying chamber 11′ moves into the region of the compressed air ducts 24, out of which the compressed air flows. Through the opening 25 of the air chamber 10, which moves past the first air duct 24, compressed air gets into the air chamber 10. Through the chamber walls 11 of an air-permeable material arranged inside the air chamber 10, air flows act on the conveying chamber 11′, which air flows penetrate into the conveying chamber 11′ through the pores of the air-permeable material and in doing so flow onto the powdered or granular material. There thus occur a current, as a result of which the powdered or granular material is acted upon and loosened by air flows during the conveying from the charging point 26 to the discharge point 27, and the action of these air flows causes the material of flow when it reaches the discharge point 27. A gravity flow is formed, which also acts on the material close to the wall, so that an adhering of the material to the smoothly machined wall is excluded.

At the discharge point 27, a pressure gradient occurs between the conveying chamber 11′ and the conveying line 30, since the injector nozzle 31 causes a suction flow. The air flows penetrating into the conveying chamber 11′ through the air-permeable chamber walls 11 are small in comparison to the compressed air jet produced by the injector nozzle 31. This ensures that during the discharging of the conveying chambers 11′ the injector action is not disturbed by a compressed air surge. A complete emptying of the discharge chambers 11′ is nevertheless guaranteed, since the solution according to the invention effectively prevents that the material adheres to the chamber walls. A special feature of the invention resides in the fact that to achieve the described effect only very small air flows are required, whereas with the known solutions always greater compressed air surges were used to ensure a complete emptying of the conveying chambers.

As a whole, by keeping the chamber walls free from material, by utilising the force of gravity and by the suction effect of the injector nozzle, a quick and complete emptying of the conveying chambers is obtained. Subsequently, when the rotor 1 continues to turn in the direction of the arrow, the flow from the air chamber 10 into the conveying chamber 11′ stops. Any over- pressure that may still be present is blown off at an exhaust point. Since no residues of material are present in the conveying chambers 11′, the environment is not polluted during the blowing-off of the over-pressure. As a result thereof the often customary scavenging of the chambers which takes place between the discharge point 27 and the charging point 26, can fall away. Since during the pressure relief of the conveying chambers 11 the environment is not polluted, the described apparatus is suitable for operating in tunnels, in mine galleries and in closed rooms.

The conveying of powdered or granular material by the proposed method can be performed with the apparatus according to the invention without any additional energy being required, since the material can be discharged from the conveying chambers without any additional, externally produced discharge pressure.

Although in the illustrated exemplified embodiment a rotor machine was described, the invention can also be used with the two-chamber machine known in technical circles.

I claim:
1. A method of conveying powdered or granular material comprising:
    charging the material into a plurality of conveying chambers of a rotor at a charging location through an opening defined in each of said conveying chambers;
    conveying said conveying chambers from said charging location to a discharging location;
    sealing said opening during said conveying step;
    delivering air to the material in said chambers during said conveying step while said openings are sealed so that the material is acted upon and loosened by said air in said chambers;
    discharging the loosened material from said conveying chambers by gravity at said discharging location;
    transferring the discharged material into a conveying line;

producing an injector air flow by means of a compressed air source; and directing said injector air flow into said conveying line to further convey the material.

2. A method as claimed in claim 1, wherein said step of delivering air includes suspending the material with said air.

3. A method as claimed in claim 1, wherein said step of delivering air includes delivering air through pores defined in substantially vertical walls of said conveying chambers.

4. A mehtod as claimed in claim 1, wherein said step of delivering air includes delivering air at least as long as said conveying chambers contain material.

5. A method as claimed in claim 1, wherein said step of directing said injector air flow includes providing an injector nozzle for conveying and spraying the material.

6. An apparatus for conveying powdered or granular material comprising:

a vertically disposed rotor including a plurality of conveying chambers symmetrically arranged about an axis of the rotor and parallel thereto, said conveying chambers having air-permeable walls;

means disposed above said rotor for charging each of said chambers with a material at a first location through an opening defined in each of said conveying chambers;

means disposed below said rotor for discharging said material from each of said chambers at a second location, spaced from said first location;

means for rotating said rotor so that said chambers are conveyed along an arced path at least from said first location to said second location;

means for sealing said opening of each said chamber while sȧid chambers are conveyed from said first location to said second location;

means for producing an air flow;

means for delivering said air flow to said material in said chambers while they are conveyed and said openings are sealed;

a conveying line for conveying material discharged at said second location; and an injector nozzle for injecting air from a compressed air source into said conveying line.

7. An apparatus as claimed in claim 6, wherein said rotor includes a plurality of air chambers, each said conveying chamber being formed by an insert disposed within each of said air chambers, and said means for delivering said air flow include means for operatively coupling said air chambers to said means for producing air flow.

8. An apparatus as claimed in claim 7, wherein said inserts are formed from a porous material and have a smooth interior surface.

9. An apparatus as claimed in claim 8, wherein said air chambers are operatively coupled to said means for producing air flow while said chambers are conveyed along said arced path, said means for delivering said air flow comprises, in combination, air ducts coupled to a stationary air connection, openings defined in a common cover plate of said inserts and said air chambers, and openings defined in said air chambers which move past said air ducts while the rotor is rotating.

10. An apparatus as claimed in claim 9, wherein said air connection is disposed on a cap disposed above said rotor and said air ducts are defined in a top sealing washer disposed between said rotor and said cap.

* * * * *